(12) United States Patent
Love

(10) Patent No.: US 6,920,439 B1
(45) Date of Patent: Jul. 19, 2005

(54) METHOD AND APPARATUS FOR INCORPORATING DECISION MAKING INTO CLASSIFIERS

(75) Inventor: Bradley C. Love, Austin, CA (US)

(73) Assignee: HRL Laboratories, LLC, Malibu, CA (US)

(*) Notice: Subject to any disclaimer, the term of this patent is extended or adjusted under 35 U.S.C. 154(b) by 473 days.

(21) Appl. No.: 09/686,112

(22) Filed: Oct. 10, 2000

(51) Int. Cl.[7] .............................. G06E 1/00; G06E 3/00; G06F 15/18; G06G 7/00

(52) U.S. Cl. .............................. 706/20; 706/15; 706/16

(58) Field of Search ................................ 706/20, 16, 15

(56) References Cited

U.S. PATENT DOCUMENTS

| 4,731,725 A | 3/1988 | Suto et al. | |
|---|---|---|---|
| 5,303,328 A | 4/1994 | Masui et al. | |
| 6,556,977 B1 | * 4/2003 | Lapointe et al. | ............... 706/15 |

FOREIGN PATENT DOCUMENTS

| WO | WO97 29447 A | 8/1997 |
|---|---|---|
| WO | WO98 22884 A | 5/1998 |
| WO | WO99 09506 A | 2/1999 |

OTHER PUBLICATIONS

Nir Friedman and Moises Goldszmidt, "Learning Bayesian networks with local structure," In Eric Horvitz and Finn Jensen, editors, Proceedings of the 12th Conference on Uncertainty in Artificial Intelligence (UAI–96), pp. 252–262, San Francisco, Aug. 1–4, 1996, Morgan Kaufmann Publishers.

John R. Anderson and Michael Matessa, "Explorations of an incremental, Bayesian algorithm for categorization," Machine Learning, 9:275–308, 1992.

J. Moody and C.J. Darken, "Fast learning in networks of locally-tuned processing units," Neural Computation, 1(2):281–294, 1989.

S. Kirkpatrick, C. D. Gelatt, and M.P. Vecchi, "Optimization by simulated annealing," Science, May 13, 1983, 220(4598): 671–680, 1983.

David Heckerman, "A tutorial on learning Bayesian networks," Technical Report MSR–TR–95–06, Microsoft Research, Mar. 1995.

K.L. Poh and E. Horvitz, "Topological proximity and relevance in graphical decision models," Technical Report MSR–TR–95–15, Research, Advanced Technology Division, 1995.

Marlon Nunez, "The use of background knowledge in decision tree induction," Machine Learning, 6:231–250, 1991.

Ming Tan, "Cost-sensitive learning of classification knowledge and its applications in robotics," Machine Learning, 13:7–33, 1993.

(Continued)

Primary Examiner—Joseph P. Hirl
(74) Attorney, Agent, or Firm—Tope-McKay & Associates

(57) ABSTRACT

A method and a system are presented, which assist classifiers in gathering information in a cost-effective manner by determining which piece of information, if any, to gather next. The system includes an explicit system, an implicit system, a classifier, and a profit module. A feature set is inputted into the explicit system, which uses the feature set to determine tests to perform to gather information useful for classifying the system state. The relative profit of each test performed is determined by the profit module and the profit determined is used to determine which test or tests to select for a particular feature set. The results of the explicit system, which is generally an exhaustive or semi-exhaustive search algorithm, are used to train the implicit system. The implicit system is then able to process decisions much faster than the explicit system when circumstances require time-critical operation.

28 Claims, 4 Drawing Sheets

OTHER PUBLICATIONS

John K. Kruschke, "ALCOVE: An exemplar–based connec J.R. Anderson, "The adaptive nature of human categorization," Psychological Review, 98: 409–429, 1991.tionist model of category learning," Psychological Review, 99(1):22–44, Jan. 1992.

Nir Friedman, "Learning belief networks in the presence of missing values and hidden variables," In Proc. 14th International Conference on Machine Learning, pp. 125–133, Morgan Kaufmann, 1997.

P. D. Turney, "Cost–sensitive classification: Empirical evaluation of a hybrid genetic decision tree induction algorithm," Journal of Artifical Intelligence Research, 2:369–409, 1995.

Avirm Blum and Pat Langley, "Selection of relevant features and examples in machine learing," Artificial Intelligence, 99: 99–99, 1998.

David Madigan, Krzysztof Mosurski, and Russell G. Almond, "Graphical explanation in belief networks," Journal of Computational and Graphical Statistics, 6(2):160–181, Jun. 1997.

Eric Horvitz and Adam Seiver, "Time–critical action: Respresentations and application," In Dan Geiger and Prakash Pundalik Shenoy, editors, Proceedings of the 13th Conference on Uncertainty in Artificial Intelligence (UAI–97), pp. 250–257, San Francisco, Aug. 1–3, 1997, Morgan Kaufmann Publishers.

Steven W. Norton, "Generating better decision trees," In N.S. Sridharan, editor, Proceedings of the 11th International Joint Conference on Artificial Intelligence, pp. 800–805, Detroit, MI, USA, Aug. 1989, Morgan Kaufmann.

* cited by examiner

FIG. 3

METHOD AND APPARATUS FOR INCORPORATING DECISION MAKING INTO CLASSIFIERS

TECHNICAL FIELD

The present invention is related to machine learning. More specifically, it relates to a method and apparatus for assisting classifiers in gathering information in a cost-effective method by determining what information to gather next.

BACKGROUND

Typically, classifiers are queried with a complete input description and respond by predicting class membership (e.g. query: "furry", "alive", "has a heart"; response: "mammal"). This framework is passive in nature. That is, the classifier behaves as if it has no control over what information it receives.

In contrast, the majority of real-world classification operations involve extensive decision-making and active information gathering. For example, a doctor trying to diagnose a patient must decide which tests to run based on the expected value and costs of the tests. The doctor is not given a static and complete featural description of a patient's state. Instead, the doctor must actively gather information. Furthermore, the doctor cannot gather every possible piece of information about the patient. Cost issues rule out this possibility. Thus, it is desirable to provide a classification system capable of making decisions in the absence of a complete set of information, and capable of weighing the relative costs of additional tests to gain additional information to the likely probative value of that information.

Method and Apparatus for Incorporating Decision Making into Classifiers Building a system that meets these goals requires the addressing of a number of issues. First, the system must be able to decide which piece of information to gather next, while taking into account the expected cost and value of the test used to gather the information. Complicating matters is the fact that there may exist cost/value interaction between the tests. The value and cost of a test can vary depending on which other tests have already been performed, or which tests are being performed in conjunction with the current test. For example, the cost of screening blood for a disease is less when a blood sample has already been taken from the patient for a previous test. Similarly, two tests may have very little value if they are performed in isolation, but may be very informative if they are both performed together.

In the case of medical diagnosis, the difficult issue often lies in deciding which test to perform next. Similarly, in many time-critical applications, the difficult issue is deciding which piece of information to process next. For example, in trying to ascertain whether one country is preparing to attack another country, thousands of satellite images and other data are available to assist in the determination. Given a very limited amount of time to arrive at a conclusion, a subset of the data must be chosen for processing.

Most currently existing machine learning systems that are sensitive to test costs can be characterized as augmented decision tree models. In general, these models are similar to decision tree models such as C4.5, except that splits in a tree are determined by a measure that is sensitive to test costs, i.e. the costs of information gathering. Myopic, or greedy, algorithms, such as EG2 by Nunez (1991), CS-ID3 by Tan (1993), and ICET by Turney (1995), tend to require large amounts of computation, and generally lead to lower quality solutions. One disadvantage of these models is that one may not want to use a decision tree model as a classifier.

The fundamental problem with the decision tree approach to test selection is that it assumes that complete control over test selection exists. Typical machine learning models make the opposite error and passively assume the classifier has no control over which tests are conducted. Both extremes are undesirable. The problems of assuming too much control over test selection are subtle, but serious. One problem is that the test requested may not be the test received. For example, in the context of a problem such as the management of battlefield information, a decision tree model may decide that a certain piece of information should be gathered. Subsequently, a patrol may be dispatched to gather the information. Due to circumstances, the patrol may be unable to perform the desired "test", but may instead perform another "test" that provides useful information. Due to its rigid nature, a decision tree would not be able to exploit this useful, but alternative, information. In fact, the decision tree would be stuck at the current juncture (not knowing which branch of the tree to descend) until the requested test's outcome is known. The problem is that the test outcome may never be known and that many other pieces of information, even some that remain unrequested, may subsequently become available. Thus, it is desirable to have a cost-based learning system that does not require the use of a decision tree for learning. A system that is able to automatically manage the costs and values associated with the classification process is highly desirable.

The Myopic model was developed in an attempt to create a cost-sensitive system that operates out of the decision-tree model context. Rather than being a classifier itself, the Myopic model is a "wrapper" system that provides added value to classifiers. The Myopic model comprises a classifier 100, a Myopic model 102, and a profit module 104, as shown in FIG. 1. Both the Myopic model 102, and the classifier 100 receive a set of features $F_n$, which describe the system state. The Myopic model 102 chooses the unknown feature that has the highest expected profit. Profit is defined as the increase in value of the current state with respect to the previous state, i.e., current value—(previous value+ current cost). If the expected profit is positive, the test is performed. If the profit is negative or all of the outcomes are known, the process terminates and the stimulus is classified. The Myopic model does not think ahead and it assumes that the expected values and costs do not interact. Its weakness lies in the fact that it does not consider the possibility that more than one test could be performed and, thus, it will not select tests that are only informative when paired with other tests.

One way to ensure that the best subset of tests is always performed is to run an exhaustive search through all possible subsets of tests in order to determine the most beneficial. The obvious drawback of this approach is that the amount of computation required increases factorially with the number of possible tests. Still, in cases where performing a test is extremely costly or risky, such an exhaustive calculation may be warranted.

As an alternative to the computational intensiveness of exhaustive search methods, hybrid methods, such as Lookahead methods, have been developed that fall between the Myopic model and exhaustive search in the quality of their solutions and the amount of computation required.

It is desirable to provide a non-decision tree-based system that is capable of weighing the cost of tests to be performed versus the probative value of the tests, and also to take into account the cost/value interaction of multiple tests. It is further desirable to minimize the computational requirements while optimizing the selection of the next test to be performed.

The following citations are provided for further reference:
[1] John R. Anderson and Michael Matessa. Explorations of an incremental, Bayesian algorithm for categorization. *Machine Learning*, 9:275–308, 1992.
[2] J. R. Anderson. The adaptive nature of human categorization. *Psychological Review*, 98:409–429, 1991.
[3] Avrim Blum and Pat Langley. Selection of relevant features and examples in machine learning. *Artificial Intelligence*, 99:99–99, 1998.
[4] Nir Friedman. Learning belief networks in the presence of missing values and hidden variables. In Proc. 14$^{th}$ *International Conference on Machine Learning*, pages 125–133. Morgan Kaufmann, 1997.
[5] Nir Friedman and Moises Goldszmidt. Learning Bayesian networks with local structure. In Eric Horvitz and Finn Jensen, editors, *Proceedings of the 12$^{th}$ Conference on Uncertainty in Artifical Intelligence* (UAI-96), pages 252–262, San Francisco, Aug. 1–4 1996. Morgan Kaufmann Publishers.
[6] David Heckernan. A tutorial on learning Bayesian networks. Technical Report MSR-TR-95-06, Microsoft Research, March 1995.
[7] Eric Horvitz and Adam Seiver. Time-critical action: Representations and application. In Dan Geiger and Prakash Pundalik Shenoy, editors, *Proceedings of the 13$^{th}$ Conference on Uncertainty in Artificial Intelligence* (UAI-97), pages 250–257, San Francisco, Aug. 1–3 1997. Morgan Kaufmann Publishers.
[8] F. V. Jensen. *An introduction to Belief Networks*. UCL Press (Taylor & Francis Ltd), London, 1996.
[9] M. I. Jordan. *Learning in Graphical Models*. Kluwer Academic Publishers, Boston, 1988.
[10] S. Kirkpatrick, C. D. Gelatt, and M. P. Vecchi. Optimization by simulated annealing. *Science*, 13 May 1983, 220(4598):671–680, 1983.
[11] John K Kruschke. ALCOVE: An exemplar-based connectionist model of category learning. *Psychological Review*, 99(1):22–44, January 1992.
[12] David Madigan, Krzysztof Mosurski, and Russell G. Almond Graphical explanation in belief networks. *Journal of Computational and Graphical Statistics*, 6(2):160–181, June 1997.
[13] J. Moody and C. J. Darken. Fast learning in networks of locally-tuned processing units. *Neural Computation*, 1(2):281–294, 1989.
[14] Steven W. Norton. Generating better decision trees. In N. S. Sridharan, editor, *Proceedings of the 11$^{th}$ International Joint Conference on Artificial Intelligence*, pages 800–805, Detroit, Mich., USA, August 1989. Morgan Kaufmann.
[15] Marlon Nunez. The use of background knowledge in decision tree induction. *Machine Learning*, 6:231–250, 1991.
[16] Judea Pearl. *Probabilistic Reasoning in Intelligent Systems: Networks of Plausible Inference*. Morgan Kaufmann, San Mateo, Calif., 1988.
[17] K. L. Poh and E. Horvitz. Topological proximity and relevance in graphical decision models. Technical Report MSR-TR-95-15, Microsoft Research, Advanced Technology Division, 1995.
[18] J. R. Quinlan. C4.5: *Programs for Machine Learning*. Morgan Kaufmann, 1992.
[19] J. C. Schlimmer. Concept acquisition through representational adjustment. Technical Report ICS-TR-87-19, University of California, Irvine, Department of Information and Computer Science, July 1987.
[20] Ming Tan. Cost-sensitive learning of classification knowledge and its application in robotics. *Machine Learning*, 13:7–33, 1993.
[21] P. D. Tumey. Cost-sensitive classification: Empirical evaluation of a hybrid genetic decision tree induction algorithm. *Journal of Artificial Intelligence Research*, 2:369–409, 1995.
[22] P. J. M. van Laarhoven and E. H. L. Aarts. *Simulated Annealing: Theory and Practice*. Kluwer Academic Publishers, Dordrecht, the Netherlands, 1987.

SUMMARY OF THE INVENTION

A method and apparatus for incorporating decision making into classifiers to provide efficient test recommendations are presented. The apparatus comprises an explicit system and a classifier, each configured to receive a system state dataset, with the explicit system connected with the classifier, and operative to iteratively perform a combinatory search procedure based on the system state dataset to develop a next test recommendation for the classifier, whereby the classifier performs the next test to generate an objective weighted score. The system state dataset is typically in the form of a vector representing the various features that describe the system state. The apparatus further includes a profit module connected with the classifier and with the explicit system to receive the objective weighted score from the classifier, to add subjective value to the objective weighted score to determine a profit for the test, and to provide the profit to the explicit system to enable the explicit system to assess the value of its next test recommendation, and, iteratively, to generate a best test recommendation based on the maximization of the profit. The apparatus further includes an implicit system configured to receive a system state dataset, and connected with the explicit system to receive the best test recommendation for each system state dataset, and to act as a function estimator to learn to associate best test recommendations with the system state dataset in order to mimic the explicit system, thereby to enable rapid decision making in situations that are either urgent or well-known.

Although the implicit system may be any probability-based learning system, it is preferably a neural network. The combinatory search procedure performed by the explicit system is preferably simulated annealing.

After the implicit system has been sufficiently trained to mimic the explicit system, the explicit system and the profit module may be separated from the implicit system in order to provide a smaller, lower cost system that approximates the performance of the overall system. This application is especially useful when the system is dealing with a fixed environment, i.e. there are few changes that would be outside the range in which the implicit system was trained.

The present invention also includes a method for enhancing decision making in a classifier system, wherein the classifier system includes an explicit system and a classifier, each configured to receive a system state dataset, with the explicit system connected with the classifier; a profit module connected with the classifier and with the explicit system; and an implicit system configured to receive a system state dataset, and connected with the explicit system, the method comprising the steps of:

a. receiving a system state dataset in the explicit system, the classifier, and the implicit system;

b. determining in the explicit system, based on the feature set, a recommended test;

c. performing the recommended test on the classifier;

d. determining, via the profit module, the profit from the test performed on the classifier;

e. detecting whether the test performed on the classifier maximizes the profit;

f. performing the receiving step a through the detecting step e until a test is found which maximizes the profit;

g. training the implicit system with the system state dataset and the test which maximizes the profit; and h. repeating steps a through g until a desired level of training of the implicit system is reached.

The implicit system used in conjunction with the method is preferably a neural network, and the determining step performed by the explicit system is performed by means of a combinatory search procedure, preferably simulated annealing. As with the apparatus, the implicit system may be separated from the explicit system and the profit module once it is sufficiently trained.

The present invention further includes a method for enhancing decision making in classifiers to provide efficient test recommendations, the method comprising the steps of:

a. providing an explicit system and a classifier each configured to receive a system state dataset, with the explicit system connected with the classifier, and operative to iteratively perform a combinatory search procedure based on the system state dataset to develop a next test recommendation for the classifier, whereby the classifier performs the next test to generate an objective weighted score;

b. providing a profit module connected with the classifier and with the explicit system to receive the objective weighted score from the classifier, to add subjective value to the objective weighted score to determine a profit for the test, and to provide the profit to the explicit system to enable the explicit system to assess the value of its next test recommendation, and, iteratively, to generate a best test recommendation based on the maximization of the profit;

c. providing an implicit system configured to receive a system state dataset, and connected with the explicit system to receive the best test recommendation for each system state dataset, and to act as a function estimator to learn to associate best test recommendations with the system state dataset in order to mimic the explicit system, thereby to enable rapid decision making in situations that are either urgent or well-known.

Again, as in the case of the apparatus, the implicit system is preferably a neural network, and the explicit system provided preferably performs the combinatory search procedure by use of simulated annealing. Also, the explicit system provided and the profit module provided may be separated from the implicit system provided after the implicit system sufficiently mimics the explicit system.

BRIEF DESCRIPTION OF THE DRAWINGS

FIG. 3 is a qualitative depiction of the process of simulated annealing, wherein Y represents tests that have already been performed and X represents tests that are planned.

DETAILED DESCRIPTION

The present invention relates to a method and an apparatus for incorporating decision making with classifiers. The following description and the accompanying drawings are presented to enable one of ordinary skill in the art to make and use the invention and to incorporate it in the context of particular applications. Various modifications to the preferred embodiment as presented herein, as well as a variety of uses in different applications will be readily apparent to those skilled in the art, and the general principles defined herein may be applied to other embodiments. Thus, the present invention is not intended to be limited to the embodiments shown, but is to be accorded the widest scope consistent with the principles and novel features disclosed herein.

The present invention incorporates decision-making with non-decision tree based classifiers to provide a means by which to optimize the selection of the next test to be performed to classify the state of the system. It does so while also minimizing computational requirements. Non-limiting examples of applications for the present invention include medical diagnosis, equipment fault diagnosis, and battlefield information management, among other decision-making systems.

Figure 1:
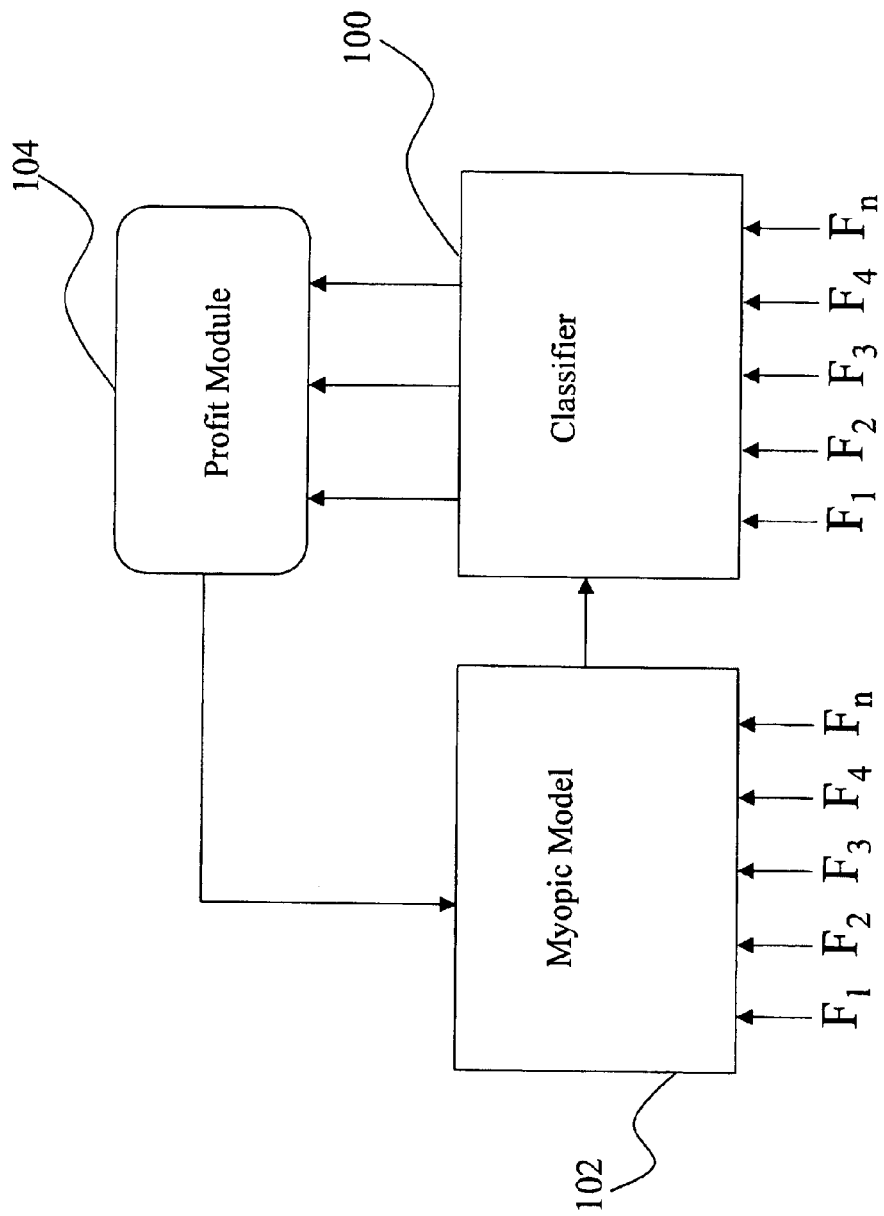
FIG. 1 is a block diagram that provides an overview of the Myopic model of classification.
Figure 2:
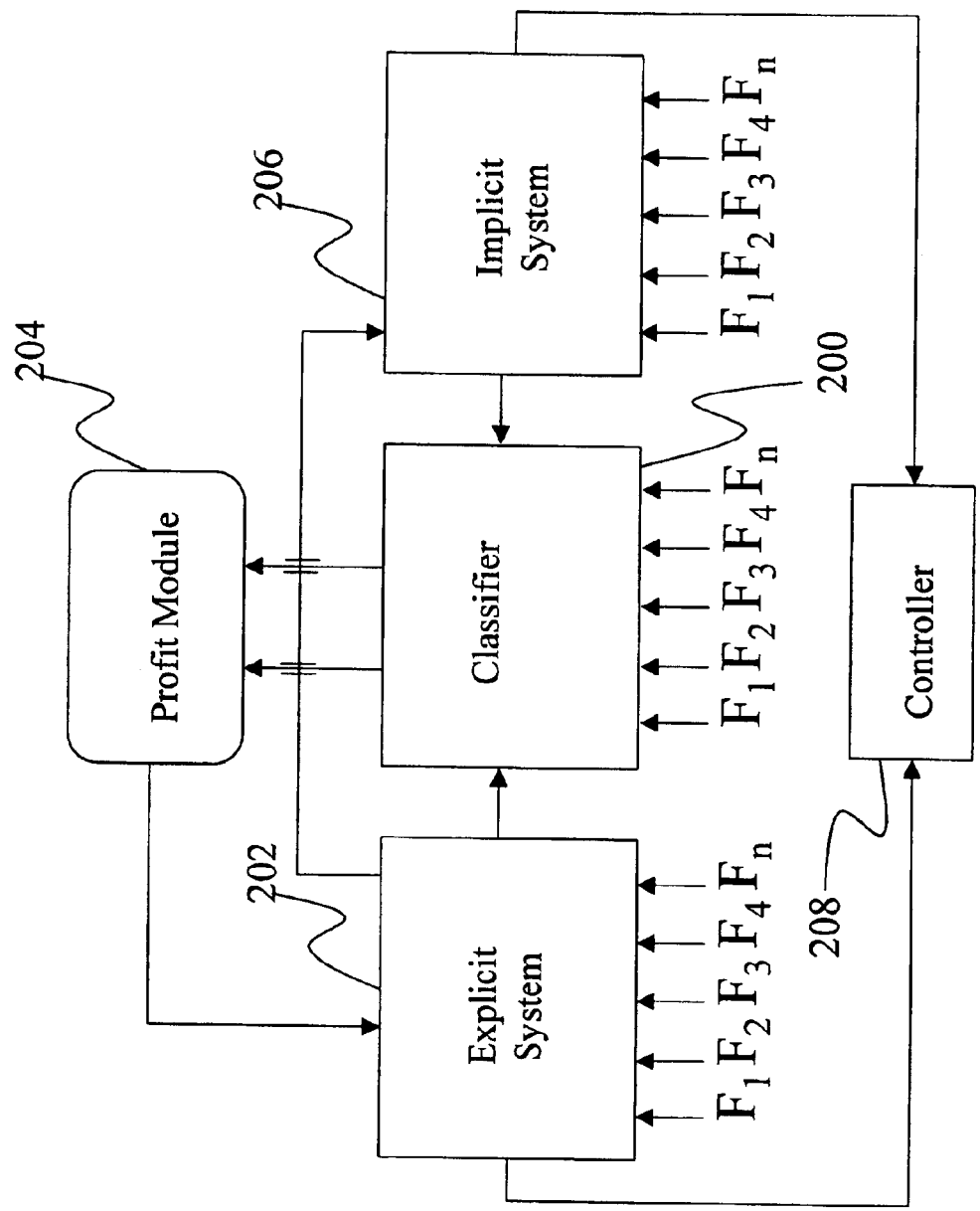
FIG. 2 is a block diagram that provides an overview an embodiment of present invention, showing one particular instantiation of its systems.

The system incorporated in the present invention approaches the search for the best subset of tests as a combinatory optimization problem. As shown in FIG. 2, the system of the present invention includes a classifier 200, an explicit system 202, a profit module 204, and an implicit system 206. The classifier 200 is preferably a probabilistic model, and is optimally selected as a Bayesian classifier. The explicit system 202 is designed to perform a combinatory search procedure, and to act as a teaching signal. The implicit system 206 is preferably a function approximator such as a radial basis function neural network. The profit module 204 provides a value of information framework, which tempers the output of the classifier 200 with subjective values.

In operation, the classifier 200, the explicit system 202, and the implicit system 206 receive feature sets, composed of $F_n$ features. The feature sets may be complete, incomplete, or may contain no information at all. The explicit system 202 combinatorially attempts to determine which tests should be performed in order to maximize the expected profit, i.e. to make a sound decision. The explicit system 202 runs virtual or hypothetical tests on the classifier 200, which, in essence, acts as a model of the world in which the system operates. As different outcomes of the tests are simulated with the classifier 200, the classifier 200 updates the probabilities of the different possible classes, e.g. the set of diagnosable diseases. These probabilities are the inputs of the profit module 204. The profit module 204 tempers the output of the classifier 200 in order to add subjective cost information relative to the set of tests performed in order to determine the profit received by performing the set of tests, i.e. output of the profit module 204 reflects the fact that with each test, there is an associated cost, and that accuracy must be sacrificed if the cost of the test is simply too high to bear. The output of the profit module 204 is provided to the explicit system 202 so that the explicit system 202 may use the feedback to set benchmarks en route to maximizing the profit from the tests. After performing a set of tests based on the feature set input, the explicit system 202 reaches a final decision of the best test or tests to run. This recommendation is then provided for training purposes to the implicit system 206. Thus, both the explicit system 202 and the implicit system 206 may be configured to provide the recommendation to a controller 208 equipped to utilize the recommendation. Although the explicit system 202 uses a combinatorial process to determine the best test or tests to run, over time the implicit system 206 learns to mimic the performance of the explicit system 202. In situations that are familiar or when a very fast approximation to the performance of the explicit system 202 is required, the implicit system can be used to provide the final decision. In cases where there are a limited number of possible situations, the explicit system 202 may be removed after the implicit system 206 has been fully trained.

The operation of each of the decision-generating components of the present invention, specifically the classifier 200, the explicit system 202, the profit module 204, and the implicit system 206, are each described in more detail in the sections that follow.

The Classifier

In principle, the classifier 200 used with the present invention may be any probabilistic model-type classifier. The classifier 200 must be able to process incomplete inputs, i.e. the classifier generates an output even though all tests have not been performed, and the output must take the form of a probability distribution over the hypothesis, i.e., the class outputs sum to 1. Additionally, the probability distributions over the test outcomes should be updated as new test results become known, e.g., if it becomes known that an object has wings, the probability that the object has feathers should increase.

A number of different classifiers satisfy these requirements, e.g., all Bayesian network classifiers are appropriate. The specific classifier 200 selected for use in a particular embodiment of the present invention will vary from application to application, depending on specific requirements.

The Explicit System

The explicit system 202 takes the form of a general purpose optimization technique such as simulated annealing. Simulated annealing may be viewed as a generalization of a local search technique such as hill climbing or gradient descent. In local search methods, changes to the current state are accepted if the quality of the solution improves. In the context of choosing the best subset of tests, a local search algorithm starts out at some state, typically in the form of a vector with an entry for each test indicating whether or not the given test is to be performed. The local search algorithm changes entries in the vector to indicate whether the test will be run, and accepts a change when the expected profit rises. When no change to the current state raises the expected profit (i.e. a local maximum is reached), the search terminates.

Simulated annealing functions like a local search, except in the sense that it occasionally accepts changes to the state that result in lower quality solutions (i.e. sometimes it goes down the hill). The probability that the algorithm accepts such changes is initially high and slowly declines. This behavior helps the algorithm avoid local maximum and increases the likelihood of reaching the global maximum (i.e., the best subset of tests).

Once a subset of tests is chosen, one test from the subset of chosen tests must be performed. Choosing one test is preferable to performing all chosen tests simultaneously because the relative payoffs of the other tests may be changed after observing the outcome of the first test. Out of the subset, the test with the highest expected profit can be chosen. Other heuristics could be adopted, e.g. genetic algorithms. Simulated annealing is preferred because it is flexible enough to deal with cases where the costs of tests are dependent upon which other tests have been performed.

Figure 3:
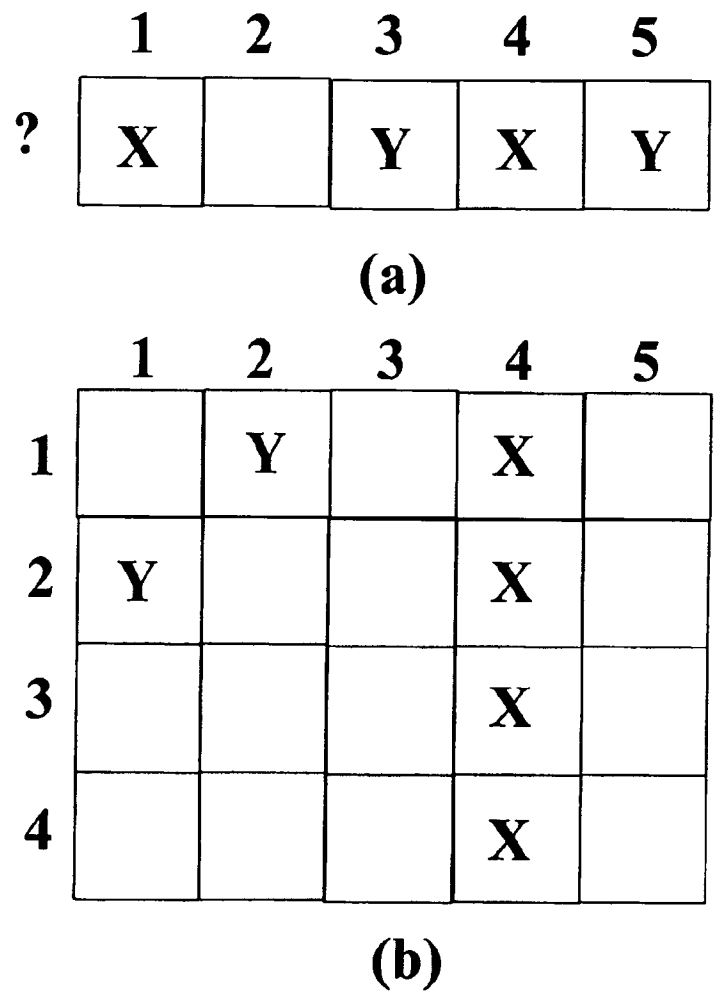

A qualitative depiction of the action of simulated annealing is shown in FIG. 3. In grids, Y represents tests that have already been performed, and X represents tests that are planned. Qualitatively, simulated annealing works by drawing and erasing Xs until a suitable subset of proposed tests is found. FIG. 3(*a*) represents a problem where the outcome of test four, in a five test series, is known, and the rest are unknown. Note that representing the problem as a vector is appropriate only when the test costs are not affected by which other tests have already been performed. The question mark signifies that some heuristic must be applied in deciding whether or not to perform test 3 or test 5.

FIG. 3(*b*) represents a problem in which test costs are affected by which other tests have already been performed. In such cases, optimization occurs over a matrix. An X in the second row, first column represents that test 1 is planned for the second time step, after test 2 is performed. The matrix is constrained to have zero or one tests planned per row. There are only four rows in the matrix because a maximum of four tests can be performed—the outcome of test 4 is already known. In this case, the answer to the question of which test to perform is clear.

While simulated annealing is computationally expensive, polynomial time simulated annealing algorithms presently exist, which provide quality solutions with reduced computational need. Furthermore, constraints can easily be incorporated that shorten the annealing process. For example, if the maximum attainable value is 100 and the current value is 80, then subsets of tests costing more than 20 should not be considered. This type of constraint can be used to shrink the search space by a large factor without compromising the quality of the final solution. This same constraint can also be used to respect hard deadlines. For instance, if a decision is required in 20 seconds, with costs stated in processing time, only subsets of tests costing less than 20 seconds in time should be considered.

Properties specific to the adopted classifier can also be exploited to reduce the search space. For example, in graphical models, topological constraints can be utilized to rule out segments of the search space. Domain specific constraints can also be used to shrink the search space. For example, if it is known that test codes are independent and that the mapping from test outcome to diagnosis is linear, then looking at single tests in isolation is warranted, i.e. the myopic model is appropriate. On the other hand, if it is known that the mapping from test outcomes to diagnosis contains interactions involving up to three tests, analogous to the parity problem with three inputs, then subsets containing as many as three tests should be considered when planning which test to perform next.

Although the explicit system uses a combinatory search procedure such as simulated annealing to yield high quality results, it does so at a high computational cost. The implicit system compliments the explicit system by providing almost instantaneous test recommendations. The implicit subsystem is a function approximator that, over time, learns to approximate the performance of the explicit system. Thus, the explicit system provides the teaching signal for the implicit system, which will be discussed in greater detail further below.

The Profit Module

The profit module 204 is a value of information framework that, based on the costs of the tests performed and the associated information gained as a result of their execution, adds subjective value to the decision making process. In order to integrate the decision making into the classification process, there must be a value to maximize for the decision-making to take place. Generally, all else being equal, the goal is to maximize the accuracy of the predictive value of the tests performed. The concept of value generalizes the term accuracy and allows for decision biases to be incorporated into classification decisions. Although a test may yield very high objective probative results, it may simply not be worth performing because the risk of error associated with an alternative may be acceptable in view of the associated cost. Table 1 below illustrates a value function, in table format, that is equivalent to the accuracy framework, i.e. maximizing value in Table 1 is equivalent to maximizing accuracy. The value table represented by Table 1 is for a two-class problem. Maximizing value is equivalent to maximizing classification accuracy, where $h_1$ and $h_2$ represent the hypotheses or categories.

TABLE 1

| Pr | Action | |
|---|---|---|
| | Choose $h_1$ | Choose $h_2$ |
| $H_1$ | 100 | 0 |
| $H_2$ | 0 | 100 |

In Table 1, the two classes, or hypotheses, $h_1$ and $h_2$ are mutually exclusive and exhaustive possibilities, i.e., $Pr(h_1)+Pr(h_2)=1$. If it is nearly certain that $h_1$ is true, e.g., $Pr(h_1)=0.99$, representing a value of $0.99(100)=99$, then $h_1$ should be chosen because choosing $h_2$ yields a smaller expected value, since $Pr(h_2)=0.01$ representing a value of $0.01(100)=1$. For ease of presentation, the value function shown in Table 1 has only two classes, e.g. missile/decoy, mammal/bird, good/bad, etc. More complex problems can involve more than two classes or categories, e.g. mammal/bird/reptile/amphibian/insect.

The action with the highest value in Table 1 is simply the action that maximizes classification accuracy. Other value functions have a more complex character. Table 2 is an example of one such value function.

TABLE 2

| Pr | Action | |
|---|---|---|
| | Choose $h_1$ | Choose $h_2$ |
| $H_1$ | 100 | -1000 |
| $H_2$ | -50 | 25 |

The value function shown in Table 2 would be well suited to situations where maximizing accuracy is not the appropriate goal, and erring on the side of caution is desirable. For example, if $h_1$ represented the probability that an unidentified target is a ballistic missile and $h_2$ represented the probability that the unidentified target is a decoy, one would probably want to attempt to shoot down the target even if one were inclined to believe it was a decoy. The value function in Table 2 reflects this decision bias. The upper-left cell represents the case where a missile is correctly identified, which yields a positive value because an enemy missile has been destroyed. The bottom-left cell represents the case where a decoy is mistaken as a missile, which has a small negative value because a missile has been wasted. The upper-right cell represents the case where a missile is mistaken as a decoy and is allowed to strike a friendly city, which has a large negative value. The lower-right cell represents the case where a decoy is correctly identified, which has a small positive value due to the destruction of a decoy.

If $h_1=0.4$, and $h_2=0.6$, the value of treating the target as a missile is $0.4(100)+0.6(-50)=10$, while the value of treating it as a decoy is $0.4(-1000)+0.6(25)=-385$. While it is more likely that the target is a decoy, treating it like a missile maximizes the expected value. If, however, it is very certain that the target is a decoy, $h_2$ will be chosen. In other words, in this situation, the value of losing missiles due to mistaken classifications of targets as missiles is much more acceptable than losing cities due to mistaken classifications of targets as decoys.

To state the above result formally, action a is considered chosen out of a set of actions A that maximizes expected value. Value is determined by weighting the entries in a value table U by the probability of each hypothesis h from the set H, as follows:

$$V(H) = \max_{a \in A} \sum_{h \in H} U(a,h)Pr(h).$$

It is important to note, that although the profit module 204 provides a subjective valuation function, it is still only as reliable as the classifier.

The profit module 204 as just described is a simple tabular function. However, more sophisticated functions may be used to map value to measure of utility in order to take into account a wide range of decision making phenomena. Specialized functions may be developed and tailored to specific embodiments designed for particular purposes, and the profit module 204 of the present invention may incorporate any one of a number of functions depending on the particular application.

Next, the use of the value function to select tests will be discussed. A model's value function is not only used for making decisions, e.g. choosing $h_1$ or $h_2$, but is also used to help direct information gathering. Ideally, it is desirable to choose the test that has the highest expected value. The expected value of performing test T may be calculated by the following:

$$EV(T) = \sum_{t \in T} V(H|t)Pr(t).$$

This computation involves setting T to each of its possible outcomes, e.g., positive/negative, red/blue/orange, etc., and weighting the resulting value by the probability of that outcome. Note that as the outcome of T is altered, the probability distribution of the hypotheses is updated, which changes the value measure. For example, if T is a binary feature, the resulting value is 50 when T is in state 1 and is 70 when T is in state 2, and the probability of T being in state 1 is 0.8, then the expected value of knowing T is $0.8(50)+0.2(70)=54$. The probability distribution for different outcomes of T is either provided by the classifier 200, as it would be in a Bayesian classifier, or it is determined by assigning a priori and updating it with the observed frequencies of the training data.

In effect, T is set to a particular outcome, as if the outcome was known, and then it is observed to see what happens. The classifier 200 is used essentially as a model of the task environment, or world, with experiments being run on the classifier to make predictions about what will transpire in the actual environment. The more veridical the classifier 200 is, the more accurate its predictions will be.

The Implicit System

The preferable implementation of the implicit system is in the form of a neural network using radial basis functions (RBFs). RBF networks are preferred because they are excellent function approximators. The input to the network is generally a vector that represents the state of the system, i.e. known test outcomes. Probing the network with an input vector results in a test recommendation. Specifically, the output of the network is a vector containing an entry for each possible test as well as an entry that signifies that testing should terminate. The activation of each entry is between 0 and 1 and all entries sum to one, i.e. the output vector is a probability distribution over recommendations. The entry with the largest activation is chosen as the recommendation. Its activation can be taken as a measure of confidence. The quality of the implicit system's test selections depend on a number of factors including the complexity of the mapping from problem state to test recommendation and the number of examples used to train the implicit system.

Overall Operation and Embodiments of the Present Invention

The explicit/implicit approach incorporated in the present invention offers a number of advantages. In time critical situations, the implicit system can be queried, while the explicit system can be queried when time is not of the essence. When processor load is low, the explicit system can provide training data to refine the implicit system.

In an alternative embodiment, such as a deployed system with limited processing power, the implicit system can be completely trained by the explicit system while off-line, and the present invention may be deployed without the explicit system.

Although the present invention can make test requests and take advantage of unrequested information, it is important to note that in situations where there is complete control over test selection, the present invention behaves like a decision tree. For example, it will always choose the same test first, and, conditioned on the outcome of the first test, it will choose another test, and so on. After the results of the first test are found, the invention proceeds like a typical decision tree.

In essence, the present invention is a wrapper that functions alongside a classification model. The explicit system determines which piece of information to gather next by querying the classifier. In effect, the classifier is used as a model of the task environment and the present invention runs experiments on this model to determine what action to perform next. The implicit system functions essentially as a memory, which condenses the work done by the explicit system into a simple input/output mapping. After some training, this input/output mapping closely approximates the output of the explicit system, but requires less computation.

The present invention has application in many task environments, and is a very useful tool in domains where incomplete information is available but where there is an opportunity to actively gather information. The present invention is also useful in situations where complete information is available, but where over-fitting is of concern. The present invention is flexible, selecting tests in an insightful, non-myopic, fashion. As it learns, the implicit system allows high quality solutions to be developed with little computation. Therefore, the present invention provides low cost, high quality solutions to classification problems.

Figure 4:
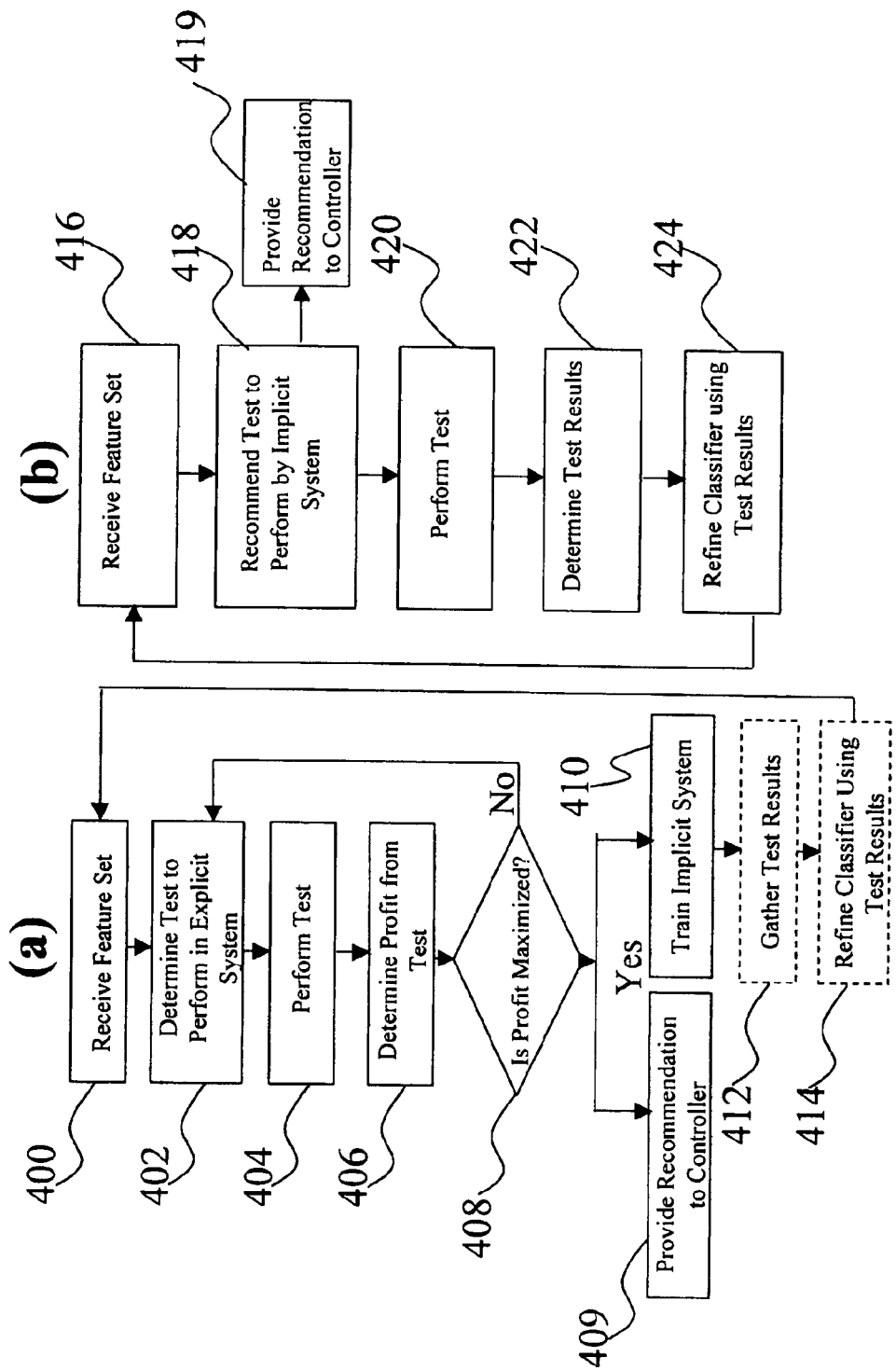
FIG. 4(a) is a flow chart that provides an overview of the use of the explicit system for training the implicit system based on profit maximization.
FIG. 4(b) is a flow chart that provides an overview of the use of the implicit system to provide recommendations.

A flow diagram showing the operation of the present invention is presented in FIG. 4. Specifically, the use of the explicit system for training the implicit system based on profit maximization is shown in FIG. 4(a), and the use of the implicit system to provide recommendations is shown in FIG. 4(b).

Referring to FIG. 4(a), in a feature-receiving step 40D, a feature set is received for a particular diagnostic situation. Next, in a test-determining step 402, a test is selected for performance by the explicit system. The explicit system 202 then performs the test in a test-performing step 404. The test may be performed either on the classifier 200 or on a real-world system, depending on the particular embodiment. Next, in a profit-determining step 406, the profit module 204 determines the profit resulting from the test. Depending on the circumstances, the function profit module 204 may be performed by explicitly inputting profit information into the system, rather than being determined automatically. Next, in a maximum-determining step 408, the profit is checked to determine if it represents a maximum. If the profit is not at a maximum, the test-determining step 402, the test-performing step 404, the profit-determining step 406, and the maximum-determining step 408 are repeated. This process continues, possibly many times, until the profit is maximized, as determined in the maximum-determining step 408. The resulting recommendation may then be provided to a controller 208 in recommendation-output step 409. Once a point of maximum profit has been found, the implicit system 206 is trained in an implicit system-training step 410 based on the feature set and the profit-maximized test recommendation. If the tests performed by the test-performing step 404 were performed on the real world, rather than on the classifier 200, the test results are gathered in a test result-gathering step 412, and are used to refine the classifier 200 in a classifier-refining step 414.

Referring to FIG. 4(b), which illustrates the use of the implicit system to provide recommendations, in a feature-receiving step 416, a feature set is received for a particular diagnostic situation. Next, the implicit system 206 makes a recommendation of the test to be performed in a test-recommending step 418. This recommendation may be provided to a controller in recommendation output step 419. The recommended test is then performed in a test-performing step 420, and the results of the test are determined in a result-determining step 422. The results of the test are then used to refine the classifier 200 in a classifier-refining step 424. The feature-receiving step 416, the test-recommending step 418, the test-performing step 420, the result-determining step 422, and the classifier-refining step 424 are repeated over and over as a diagnosis is made. It is important to note that the flow charts shown in FIG. 4(a) and FIG. 4(b) interact as the system is operated over time. The explicit system 202 may be used exclusively for training the implicit system 206, with the implicit system 206 being the only system for providing recommendations based on real world situations to a controller 208. On the other hand, both the explicit system 202 and the implicit system 206 may be used for real world operations. In operation, both the explicit system 202 and the implicit system 206 act to generate recommendations that are passed to a controller 208. The controller could be a human being, a machine, or any other system able to utilize the recommendations. The system could be connected to automatically act upon the recommendations after a certain time has passed. When both the explicit system 202 and the implicit system 206 are used to generate recommendations, situations may arise in which it is uncertain which system to use for a recommendation. A possible solution in this situation is to always probe the implicit system 206 for a solution, while at the same time the explicit system 202 begins developing a recommendation. If the explicit system 202 does not finish before an action has to be taken, then the implicit system 206 provides the recommendation. On the other hand, if the explicit system 202 finishes developing its recommendation before the action must be taken, then the recommendation of the explicit system 202 is used. Other solutions could be developed, such as providing an explicit system 202 designed to provide faster, lower quality solutions, for example, by altering the schedule for simulated annealing to speed execution time, while reducing the likelihood of finding an optimal solution. The explicit system 202 can use any optimization or search procedure, including, but not limited to, genetic algorithms, exhaustive search algorithms, and beam searching, among many others. On the other hand, any machine-learning model can be used in the implicit system 206, provided that it can do probabilistic function approximation.

What is claimed is:

1. An apparatus for incorporating decision making into classifiers to provide efficient test recommendations, the apparatus comprising:
   a. an explicit system and a classifier each configured to receive a system state dataset the explicit system connected with the classifier and operative to iteratively perform a combinatory search procedure based on the system state dataset to develop a next test recommendation for the classifier, whereby the classifier performs the next test to generate an objective weighted score;
   b. a profit module connected with the classifier and with the explicit system to receive the objective weighted score from the classifier, to add subjective value to the objective weighted score to determine a profit for the test, and to provide the profit to the explicit system to enable the explicit system to i. assess the value of its next test recommendation and ii. to iteratively generate a best test recommendation based on the maximization of the profit;
   c. an implicit system configured to receive a system state dataset, and connected with the explicit system to receive the best test recommendation for each system state dataset, and to act as a function estimator to learn to associate best test recommendations with the system state dataset in order to mimic the explicit system, thereby to enable rapid decision making in situations that are either urgent or well-known.

2. An apparatus for incorporating decision making into classifiers to provide efficient test recommendations as set forth in claim 1, wherein the explicit system and the implicit system are configured to provide test recommendations to a controller.

3. An apparatus for incorporating decision making into classifiers to provide efficient test recommendations as set forth in claim 1, wherein the implicit system is a neural network.

4. An apparatus for incorporating decision making into classifiers to provide efficient test recommendations at set forth in claim 3, wherein the neural network is a radial basis neural network.

5. An apparatus for incorporating decision making into classifiers to provide efficient test recommendations as set forth in claim 3, wherein the combinatory search procedure performed by the explicit system is simulated annealing.

6. An apparatus for incorporating decision making into classifiers to provide efficient test recommendations as set forth in claim 5, wherein the explicit system and the profit module may be separated from the apparatus after the implicit system sufficiently mimics the explicit system.

7. An apparatus for incorporating decision making into classifiers to provide efficient test recommendations as set forth in claim 1, wherein the system state is a vector.

8. An apparatus for incorporating decision making into classifiers to provide efficient test recommendations as set forth in claim 1, wherein the classifier is a probabilistic model.

9. An apparatus for incorporating decision making into classifiers to provide efficient test recommendations as set forth in claim 8, wherein the classifier is Bayesian.

10. A computerized method for enhancing decision making in a classifier system, wherein the classifier system includes an explicit system and a classifier, each configured to receive a system state dataset, with the explicit system connected with the classifier; a profit module connected with the classifier and with the explicit system; and an implicit system configured to receive a system state dataset, and connected with the explicit system, the computerized method comprising the steps of:
   a. receiving a system state dataset in the explicit system, the classifier, and the implicit system;
   b. determining in the explicit system, based on the feature set, a recommended test;
   c. performing the recommended test on the classifier;
   d. determining, via the profit module, the profit from the test performed on the classifier;
   e. detecting whether the test performed on the classifier maximizes the profit;
   f. performing the receiving step a through the detecting step e until a test is found which maximizes the profit;
   g. training the implicit system with the system state dataset and the test which maximizes the profit; and
   h. repeating steps a through g until a desired level of training of the implicit system is reached.

11. A computerized method for enhancing decision making in a classifier system as set forth in claim 10, wherein the test that maximizes the profit is provided by either the explicit system or the implicit system to a controller.

12. A computerized method for enhancing decision making in a classifier system as set forth in claim 10, wherein the implicit system used is a neural network.

13. A computerized method for enhancing decision making in a classifier system as set forth in claim 12, wherein the implicit system used is a radial basis neural network.

14. A computerized method for enhancing decision making in a classifier system as set forth in claim 12, wherein the determining step b is performed by the explicit system using a combinatory search procedure.

15. A computerized method for enhancing decision making in a classifier system as set forth in claim 14, wherein the combinatory search procedure performed by the explicit system in the determining step b is simulated annealing.

16. A computerized method for enhancing decision making in a classifier system as set forth in claim 15, wherein the explicit system and the profit module used may be separated from the classifier system after the implicit system sufficiently mimics the explicit system.

17. A computerized method for enhancing decision making into classifiers to provide efficient test recommendations as set forth in claim 10, wherein the system state is a vector.

18. A computerized method for enhancing decision making into classifiers to provide efficient test recommendations as set forth in claim 10, wherein the classifier is a probabilistic model.

19. A computerized method for enhancing decision making into classifiers to provide efficient test recommendations as set forth in claim 18, wherein the classifier is Bayesian.

20. A computerized method for enhancing decision making in classifiers to provide efficient test recommendations, the computerized method comprising the steps of:
 a. providing an explicit system and a classifier each configured to receive a system state dataset, with the explicit system connected with the classifier, and operative to iteratively perform a combinatory search procedure based on the system state dataset to develop a next test recommendation for the classifier, whereby the classifier performs the next test to generate an objective weighted score;
 b. providing a profit module connected with the classifier and with the explicit system to receive the objective weighted score from the classifier, to add subjective value to the objective weighted score to determine a profit for the test, and to provide the profit to the explicit system to enable the explicit system to assess the value of its next test recommendation, and, iteratively, to generate a best test recommendation based on the maximization of the profit;
 c. providing an implicit system configured to receive a system state dataset, and connected with the explicit system to receive the best test recommendation for each system state dataset, and to act as a function estimator to learn to associate best test recommendations with the system state dataset in order to mimic the explicit system, thereby to enable rapid decision making in situations that are either urgent or well-known.

21. A computerized method for enhancing decision making in a classifier system as set forth in claim 20, wherein the explicit system and the implicit system are further configured to provide the test recommendation to a controller.

22. A computerized method for enhancing decision making in a classifier system as set forth in claim 20, wherein the implicit system provided is a neural network.

23. A computerized method for enhancing decision making in a classifier system as set forth in claim 22, wherein the implicit system provided is a radial bias neural network.

24. A computerized method for enhancing decision making in a classifier system as set forth in claim 22, wherein the explicit system provided performs the combinatory search procedure by use of simulated annealing.

25. A computerized method for enhancing decision making in a classifier system as set forth in claim 24, wherein the explicit system provided and the profit module provided may be separated from the classifier system provided after the implicit system sufficiently mimics the explicit system.

26. A computerized method for enhancing decision making in classifiers to provide efficient test recommendations as set forth in claim 20, wherein the system state is a vector.

27. A computerized method for enhancing decision making in classifiers to provide efficient test recommendations as set forth in claim 20, wherein the classifier is a probabilistic model.

28. A computerized method for enhancing decision making in classifiers to provide efficient test recommendations as set forth in claim 27, wherein the classifier is Bayesian.

* * * * *

UNITED STATES PATENT AND TRADEMARK OFFICE
CERTIFICATE OF CORRECTION

PATENT NO. : 6,920,439 B1 Page 1 of 1
APPLICATION NO. : 09/686112
DATED : July 19, 2005
INVENTOR(S) : Bradley C. Love It is certified that error appears in the above-identified patent and that said Letters Patent is hereby corrected as shown below:

In column 12, line 5, "40D" should read --400--

Signed and Sealed this

Thirteenth Day of May, 2008

JON W. DUDAS
*Director of the United States Patent and Trademark Office*